Figure 1:
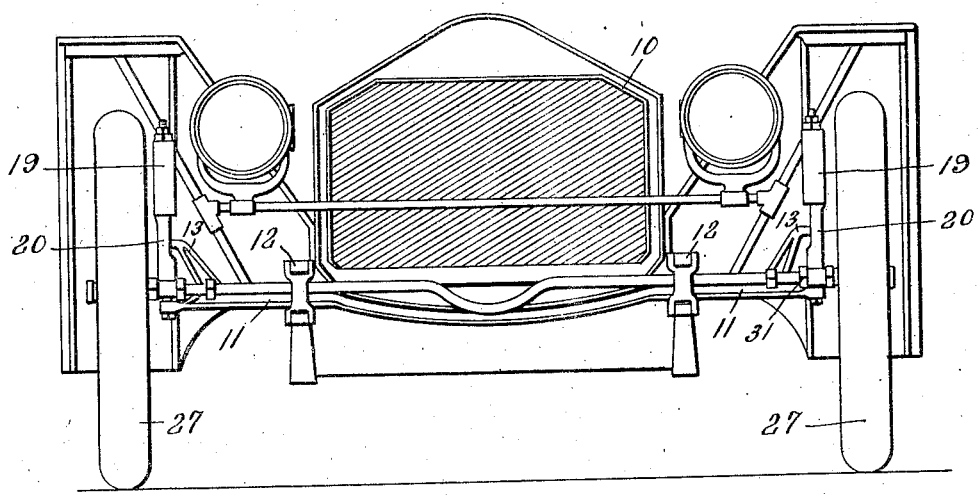

C. D. SWORD.
SHOCK ABSORBER.
APPLICATION FILED NOV. 17, 1911.

1,049,620.

Patented Jan. 7, 1913
3 SHEETS—SHEET 1.

Inventor
Charles D. Sword

Witnesses
H. G. Robinette
J. T. Mawhinney

By Meyers, Cushman & Rea
Attorneys

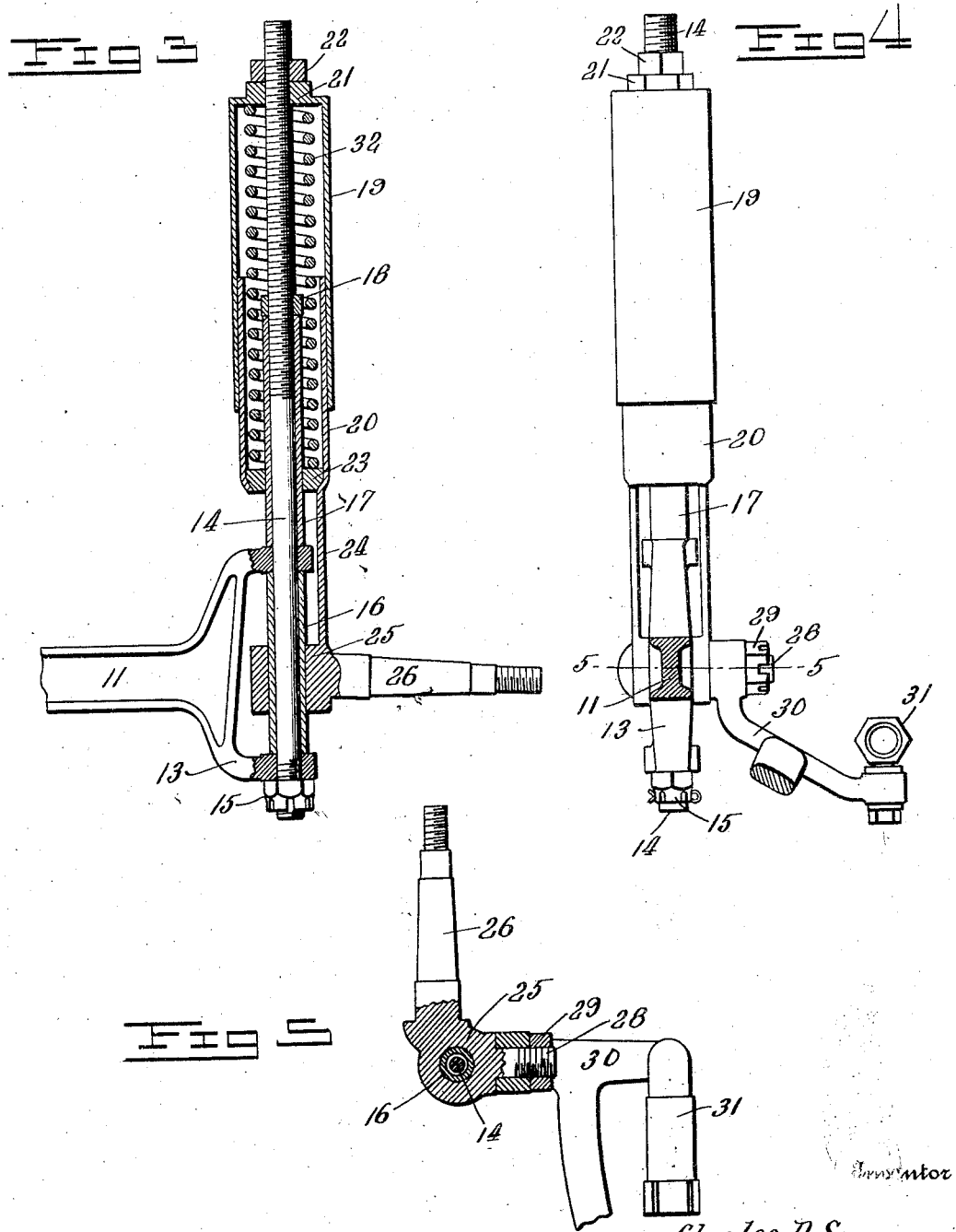

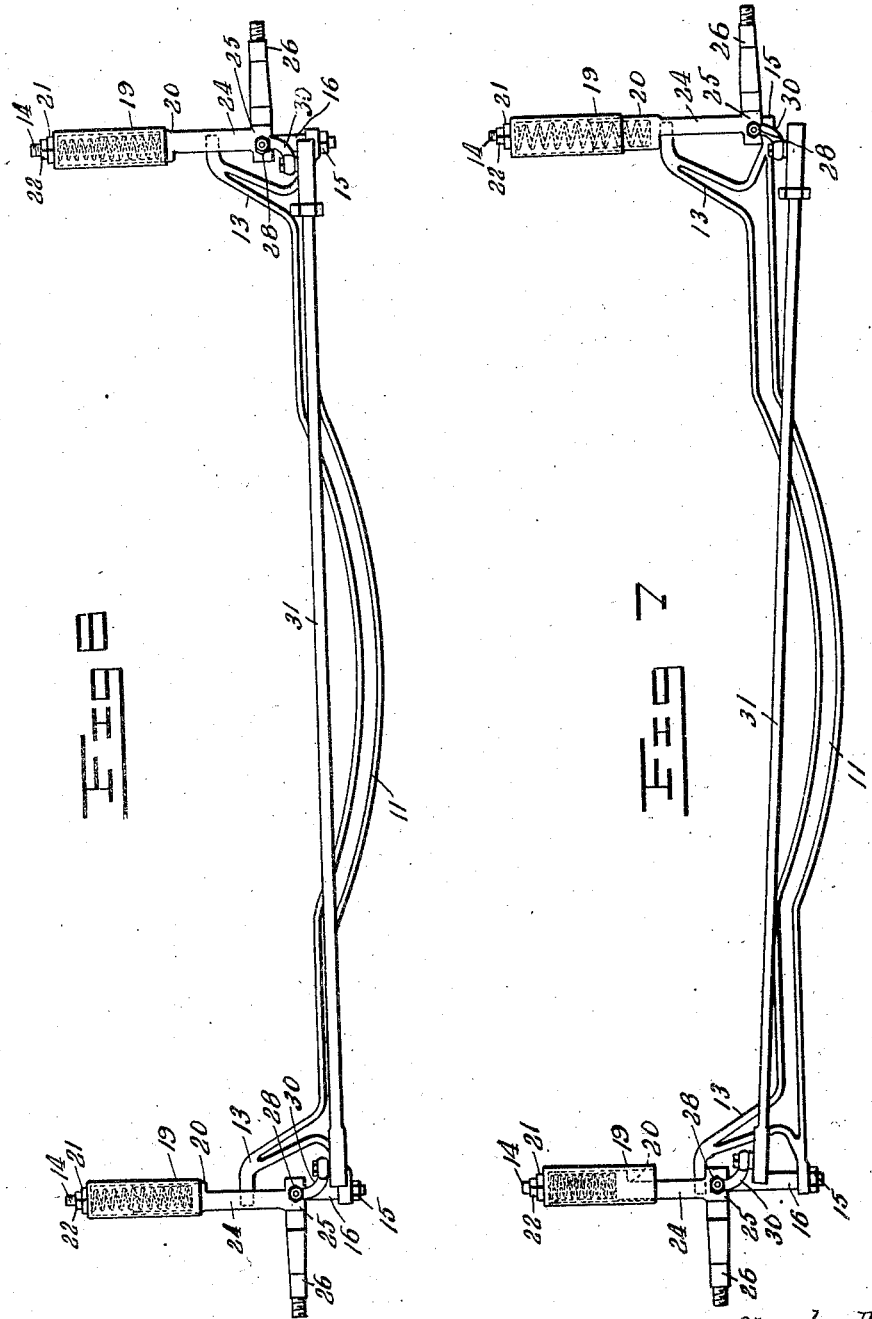

UNITED STATES PATENT OFFICE.

CHARLES DURM SWORD, OF DETROIT, MICHIGAN

SHOCK-ABSORBER.

1,049,620.  Specification of Letters Patent.  Patented Jan. 7, 1913.

Application filed November 17, 1911. Serial No. 660,828.

*To all whom it may concern:*

Be it known that I, CHARLES DURM SWORD, a citizen of the United States, residing at Detroit, in the county of Wayne and State of Michigan, have invented new and useful Improvements in Shock-Absorbers, of which the following is a specification.

This invention relates to an improved shock absorber, particularly for motor vehicles, and has special reference to a device utilized as a connection between the axle and the wheels of the vehicle.

The invention aims at the provision of a device for absorbing the shock imparted to each wheel individually, and to relieve the axle of constant vibrating motion incident to a rigid connection between the axle and the wheel, and to thereby impart to the axle a relatively slow easy vertical movement which is almost completely absorbed in the springs supporting the body of the vehicle upon the axle.

Another very important object of the invention is to construct a device of this nature which may be readily applied to axles of common form and size, and which takes the place of the common spindle connection now used between the wheels and the axle, and to which the device may be readily applied, and connected to the usual steering mechanism.

A very important object of this invention is to provide means admitting of the independent dropping of the front wheels of the vehicle into holes or ruts in the roadway, and to retain the axle substantially in its normal horizontal position during such dropping of the wheels. In accomplishing this object the invention designs a peculiar support or connection for each wheel which yieldingly presses the wheel down so that when it is suddenly relieved of the weight which it carries the support or connection immediately expands and holds the axle up while the wheel drops from it. When the wheel rises from the hole or rut to normal position the support contracts and absorbs the shock directed to the axle incident to the impact on the wheel in rising. Thus a steady, uniform and practically non-vibrating movement is imparted to the body of the vehicle when traveling.

It is thus seen that when this improved shock absorber is applied to motor vehicles of the "underslung" type, the pounding of the axles against the side bars of the frame will be materially lessened and practically obviated, since the shock is absorbed in the connection between the wheels and the axle, whereby the axle moves slowly and evenly, giving the body springs ample time to take up such movement.

Broadly, the invention comprises a fixed vertical rod carried through the knuckle end of an axle of common form, the upper end of the rod being connected to one end of a spring, and a spindle member slidable on the rod between the arms of the knuckle end and being connected to the opposite end of the spring, the spindle member carrying the wheel of the vehicle and being also provided with a projection for attachment of the steering mechanism thereto. It is thus seen that this improved shock absorber can be attached to any motor vehicle of common construction by simply substituting the improved shock absorber in lieu of the spindle member now supported upon the knuckle end of the axle. It is also known that there are various kinds of shock absorbers patented and in use, but this invention has for an object to combine in a single device the herein noted advantages with all of the desirable features of adjustment and adaptation found in the best of the shock absorbers in use.

Other objects and advantages of this invention will be more specifically pointed out in the following disclosure of one embodiment of the invention, and illustrated in the annexed drawings, in which:—

Figure 2:
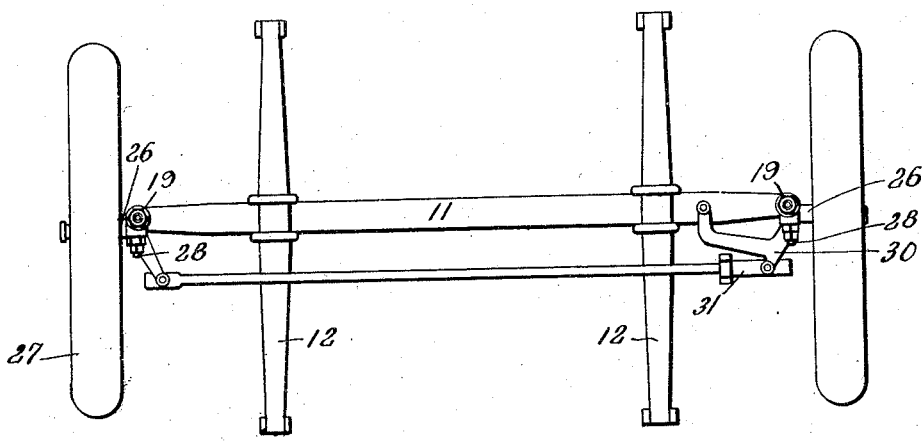

Figure 1 is a front elevation of a motor vehicle of the "underslung" type having the improved shock absorber applied thereto. Fig. 2 is a top plan view of the forward end of the running gear of the motor vehicle, having the shock absorber applied thereto. Fig. 3 is a vertical central section taken through the shock absorber as applied to one end of the front axle. Fig. 4 is an inner side elevation of the shock absorber, showing its connection with the steering mechanism. Fig. 5 is a horizontal section on the line 5—5 of Fig. 4. Fig. 6 is a front elevation of a front axle having an improved shock absorber applied to each end thereof, and in normal position. Fig. 7 is a similar view showing one of the shock absorbers in position when passing over a rise in the roadway, and the other shock absorber in position when passing over holes or ruts in the roadway.

Referring to the drawings disclosing one embodiment of the invention, and in which like parts are designated by similar reference characters throughout the various views, 10 designates the body of a motor vehicle hung at its forward end upon a front axle 11 by springs 12. The front axle 11 is provided at each end with a knuckle 13 comprising a pair of vertically spaced and registering arms having vertical registering apertures therethrough in the usual manner.

The improved shock absorber comprises a bolt 14 engaging through the knuckle end 13, and being held in vertical and rigid position therethrough by a binding nut 15 threaded upon its lower end and engaging against the lower fork arm. A bearing sleeve 16 is snugly fitted about the bolt 14 between the fork arms of the knuckle end 13, and has its ends fitting snugly against the inner opposite faces of the fork arms. A retaining sleeve 17 is fitted about the bolt 14 above the knuckle end 13, and has its lower end resting upon the upper fork arm. A binding nut 18 is threaded over the upper end of the bolt 14, and binds against the upper end of the retaining sleeve 17 to hold the latter against the knuckle end 13, and draws the bolt 14 tightly up through the knuckle end 13. The upper end of the bolt 14 is housed within a cylinder, the same comprising a pair of telescoping cylinder members 19 and 20, the member 19 being provided with an integral cap nut 21 engaging in threaded relation over the bolt 14 and adapted for adjustment thereon. A lock nut 22 is also threaded over the upper end of the bolt 14 to bind against the cap nut 21 to lock the same when adjusted. The lower cylinder member 20 is slidable within the lower end of the upper member 19, and is provided at its lower end with a closing ring 23 slidably engaging over the retaining sleeve 17, and being fixed in the lower end of the member 20. The outer side of the member 20 is provided with a depending projection or spindle member 24 which is semi-cylindrical in form, extending down to a point between the fork arms of the knuckle end 13. The lower end of the spindle member 24 is provided with a sleeve 25 encircling the bearing sleeve 16 and adapted to move vertically thereover, the sleeve 25 carrying an integral spindle 26 upon which the front wheel 27 is mounted. The sleeve 25 is provided at its forward side with a stud or projection 28 to which is secured, by a lock nut 29, a spindle arm 30, one branch of which is suitably connected to the rod 31 of the steering mechanism. The opposite branch of the arm 30 has connection with the steering mechanism of the vehicle. Within the cylinder is disposed a compression spring 32, the lower end of which rests upon the ring 23 within the lower member 20, while the upper end bears against the inner side of the cap nut 21 and is adjusted as to tension by the same.

The operation of the improved shock absorber is as follows. When the device is applied to the axle of a vehicle so as to support the end of the axle, the cap nut 21 is moved down over the bolt 14 to compress the spring 32 to the desired tension to yieldingly hold the spindle sleeve 25 midway between the fork arms of the knuckle end 13. This is the normal position of the shock absorber, and is clearly disclosed in Fig. 3 of the drawings. When the wheel 27 receives a sudden jar or shock, such jar or shock is imparted to the spindle 26 and the sleeve 25, the latter moving up about the bearing sleeve 16 and carrying the lower member 20 of the cylinder up within the member 19, compressing the spring 32 which increases in tension and absorbs, to a large extent, such shock or vibration. If the wheel 27 remains in raised position the spring 32 gradually expands to its normal condition, and raises the knuckle end 13 of the axle to its normal position with respect to the spindle sleeve 25. It is thus seen that when the wheel 27 passes over obstacles in the roadway, or rises suddenly from one surface to a higher surface in the roadway that such change is imparted gradually to the axle 11, and consequently such shock is practically absorbed before it reaches the body 10 of the vehicle. It is also apparent that the axle 11 receives but a slight vertical movement, which is readily absorbed by the body springs of the vehicle so that the body of the vehicle receives practically no shock even under the most trying road conditions.

By means of the cap nut 21 the improved shock absorber may be readily applied to machines varying in weight, so as to position the spindle sleeve 25 at all times midway between the fork arms of the knuckle end 13. Since the binding nut 15 upon the lower end of the bolt 14 is a locking nut, and since the cap nut 21 is held in position by the lock nut 22 it is readily seen that the device cannot jar out of adjustment or any of the parts become detached without the release of these locked parts. In making the spindle member 24 of semi-cylindrical form the lower member 20, together with the spindle member, is permitted to swing about the bolt 14 by the operation of the steering mechanism in order to throw the spindle 26 into various angles with respect to the axle 11. It will be further noted that should the wheel 27 drop into a depression in the road that the spring 32 expands and moves the spindle member 24 down into the lower end of the knuckle end 13, and that the axle 11 will then fall gradually under the increasing tension of the spring.

Should the wheel rise immediately from the depression, it is seen that the deflection of the axle will be comparatively slight.

Having thus described the invention what is claimed as new is:—

1. A shock absorber comprising a bolt for fixed engagement to an axle, a movable member slidable on the bolt and having a wheel supporting spindle, a cylinder mounted on the movable member and extending upwardly from the axle, a spring located in the cylinder about the bolt and extending above the cylinder, and a cap adjustable upon the bolt and engaging the upper end of the spring to compress the latter.

2. In combination with an axle having a knuckle end, a bolt engaging vertically through the knuckle end, a bearing sleeve carried about the bolt within the knuckle end, a spindle member slidable upon the bearing sleeve and having a spindle extending outwardly therefrom, an inner cylinder member carried upon the upper end of the spindle member about the bolt, a spring arranged within the lower cylinder member, and a cylinder member adjustable upon the upper end of the bolt and against the end of the spring to adjust the tension of the latter.

3. In combination with an axle having a knuckle end, of a bolt fixed upon the arms of the knuckle and extending upward from the same, a spindle member mounted upon the bolt between the arms of the knuckle and adapted to slide over the bolt, and yielding connecting means secured to the upper end of the bolt above the knuckle end and having connection with the spindle member to yieldingly hold the same in intermediate position between the arms of the knuckle.

4. In combination with an axle having a forked end, of a bolt adjustably mounted through the forked end and being adapted to be fixed relative to the forked end when adjusted, a spindle member slidable on the bolt between the arms of the forked end, and a yielding connection carried upon the upper end of the bolt above the forked end and having connection with the spindle member to yieldingly hold the same in position between the arms of the forked end.

5. A shock absorber comprising a bolt adapted for engagement at its lower end through the arms of an axle knuckle, a bearing sleeve carried about the bolt and engaging at its opposite ends against the inner sides of the said arms, a retaining sleeve carried about the bolt and resting at its lower end upon the upper arm of said knuckle, a binding nut threaded over the upper end of the bolt and engaging the upper end of said retaining sleeve to bind the same against the arm, a second binding nut on the lower end of the bolt engaging the lower arm of said knuckle to retain the bolt in place, a cap threaded for adjustment upon the upper end of the bolt, a cylinder member slidable on the retaining sleeve and extending up into the cap, a spring about the retaining sleeve and the bolt and engaging at its opposite ends the cap and the cylinder member respectively, and a spindle member slidable on the bearing sleeve and having connection with the cylinder member whereby said spindle member is yieldingly held in position.

6. A shock absorber comprising a bolt adapted for passage at its lower end through the knuckle arms of an axle, a bearing sleeve carried about the bolt and adapted for snug engagement between the knuckle arms, a spindle member slidable on the bearing sleeve and having an upstanding part rising about the knuckle arms, the upstanding part being provided with a cylinder engaging about the bolt, a retaining sleeve disposed on the upper end of the bolt and resting against the upper knuckle arm, binding nuts on the bolt one disposed against the lower side of the lower knuckle arm and another engaging the upper end of the retaining sleeve to hold the bolt firmly in place, a cap threaded for adjustment on the upper end of the bolt and engaging over the upper end of the cylinder, and a spring about the bolt and engaging at its opposite ends within the cap and the cylinder respectively whereby said spindle member is yieldingly held in normal position.

7. A shock absorber comprising a bolt for attachment to an axle fork and adapted to extend upwardly therefrom, a cap carried upon the upper end of the bolt above the axle fork, a member slidable on the bolt between the arms of the axle fork and having a wheel spindle projecting outwardly therefrom, a cylinder member carried on the spindle member and engaging about the bolt above the axle fork and slidably engaging in the cap, and a compression spring carried within the cylinder and the cap about the bolt and above the axle fork.

In testimony whereof I have hereunto set my hand in presence of two subscribing witnesses.

CHARLES DURM SWORD.

Witnesses:
R. M. STOCKMAN,
GERTRUDE M. STUCKER.